United States Patent [19]

Willms

[11] Patent Number: 5,129,732
[45] Date of Patent: Jul. 14, 1992

[54] SENSOR FOR DETERMINING THE TEMPERATURE AVERAGED ON THE BASIS OF MASS FLOW DENSITY

[75] Inventor: Herbert Willms, Neuenstadt-Stein, Fed. Rep. of Germany

[73] Assignee: Deutsche Forschungsanstalt fuer Luft- und Raumfahrt e.V., Fed. Rep. of Germany

[21] Appl. No.: 612,005

[22] Filed: Nov. 9, 1990

[30] Foreign Application Priority Data

Nov. 14, 1989 [DE] Fed. Rep. of Germany ....... 3937783

[51] Int. Cl.$^5$ .......................... G01K 3/02; G01K 7/16
[52] U.S. Cl. ...................................... 374/116; 374/185
[58] Field of Search ............... 374/115, 116, 185, 138, 374/147, 148; 73/204.25, 204.26, 204.27; 338/211, 217, 258, 308, 225 D

[56] References Cited

U.S. PATENT DOCUMENTS

| | | | |
|---|---|---|---|
| 1,902,427 | 3/1933 | Sawyer | 374/116 |
| 2,717,946 | 9/1955 | Peck | 338/258 |
| 3,470,744 | 10/1969 | Lindberg | 374/115 |
| 3,803,708 | 4/1974 | Wada et al. | 29/620 |
| 3,851,150 | 11/1974 | Von Holzen | 219/553 |
| 4,547,079 | 10/1985 | Alamprese et al. | 374/116 |
| 4,559,814 | 12/1985 | Sato et al. | 73/204.26 |

FOREIGN PATENT DOCUMENTS

| | | | |
|---|---|---|---|
| 0055762 | 4/1983 | Japan | 73/204.27 |
| 2169708 | 7/1986 | United Kingdom | 374/115 |

*Primary Examiner*—Thomas B. Will
*Assistant Examiner*—W. Morris Worth
*Attorney, Agent, or Firm*—Barry R. Lipsitz

[57] ABSTRACT

In order to create a sensor for determining the temperature averaged on the basis of the mass flow density of a medium flowing through a tube, this medium having a mass flow density gradient and a temperature gradient in the tube transverse to the direction of flow, which allows the temperature averaged on the basis of the mass flow density to be ascertained more reliably and even more exactly, it is suggested that the sensor comprise a carrier body and a resistor body held thereby, the resistor body having a measuring current flowing therethrough and a temperature-responsive variable electrical resistance which leads for its part to a correspondingly variable voltage drop, and that the resistor body be designed such that the temperature-responsive variable electrical resistance of the resistor body varies with extension of the resistor body in a transverse direction in accordance with the mass flow density.

13 Claims, 5 Drawing Sheets

SENSOR FOR DETERMINING THE TEMPERATURE AVERAGED ON THE BASIS OF MASS FLOW DENSITY

The invention relates to a sensor for determining the temperature averaged on the basis of the mass flow density of a medium flowing through a tube, the medium having a mass flow density gradient and a temperature gradient in the tube transverse to the direction of flow. Altogether, the invention relates to a sensor for determining the temperature averaged on the basis of the mass flow density in a combustion chamber of a hydrogen/oxygen steam generator which preferably operates with hydrogen and oxygen supplied under stoichiometric conditions as well as water injected after combustion thereof and serves as a steam reserve for steam power stations. The problem in such a hydrogen/oxygen steam generator is to determine, in the combustion chamber thereof and as far as possible immediately the steam is generated, the temperature found in the steam after an intensive mixing and after generation of a homogenous steam flow. Preferably, the sensor is hereby arranged in a region of the combustion chamber facing an extraction opening thereof.

Up to now it has merely been known to arrange a plurality of thermocouple elements one behind the other in the direction of the mass flow density gradient as sensor for ascertaining a temperature averaged on the basis of the mass flow density. The measurement values supplied by these thermocouple elements are then used as reference points for the course of the temperature averaged on the basis of the mass flow density and this temperature is then calculated by a corresponding evaluation program.

The object underlying the invention is therefore to create a sensor of the generic type which allows the temperature averaged on the basis of the mass flow density to be ascertained more reliably and even more exactly.

This object is accomplished according to the invention, for a sensor of the type described at the outset, in that the sensor comprises a carrier body and a resistor body held thereby, the resistor body having a measuring current flowing therethrough and a temperature-responsive variable electrical resistance which leads for its part to a correspondingly variable voltage drop, and that the resistor body is designed such that the temperature-responsive variable electrical resistance of the resistor body varies with extension of the resistor body in a transverse direction, substantially reciprocally proportional to the mass flow density.

Due to this special design of the resistor body the temperature-responsive variable resistance which is to be measured can also be varied in accordance with the variation of the mass flow density in the transverse direction so that the voltage drop measured at the resistor body immediately reproduces a value corresponding to the temperature averaged on the basis of the mass flow density.

With the inventive sensor, in contrast to the state of the art, a simple measuring method is first of all achieved since only one measurement value has to be measured. On the other hand, this method is substantially more exact since measurements are taken not only at several reference points located one behind the other in the transverse direction. In addition, measurements can be taken substantially more quickly since the average value need not be established on the basis of reference points via an evaluation program but is already on hand with the measurement of one parameter, i.e. the voltage drop.

The embodiment described at the outset does not specify how a temperature-responsive variable resistance of the resistor body can be achieved with the extension of the resistor body in the transverse direction.

In a particularly preferred embodiment, the current-carrying cross-sectional area of the resistor body varies with the extension of the resistor body in the transverse direction. In this respect the resistor body is traversed by current in the transverse direction and so the current flows through varying cross-sectional areas in the transverse direction and is therefore subject to a greater or lesser temperature influence depending on the cross-sectional area. Altogether, the voltage drop at the sensor results in the temperature value averaged on the basis of the mass flow density.

A resistor body of this type may be formed particularly simply by a layer of resistance material applied to the carrier.

Favourably, the layer of resistance material has a locally constant specific resistance.

The layer of resistance material may be applied in a particularly simple manner by vapour deposition onto the carrier body.

In the particular case where the current-carrying cross-sectional area of the resistor body is to be defined at each point in the transverse direction by way of the shape of the carrier body, it is advantageous for the layer of resistance material to form a layer having a constant layer thickness on the carrier body.

The variation in the cross-sectional area of the layer can be most simply achieved by varying the expansion of the layer at right angles to the transverse direction. In this respect the expansion of the layer is favourably determined by the surface expansion of the carrier body at right angles to the transverse direction.

It is, however, also possible for the expansion of the layer of resistance material to vary in a direction at right angles to the transverse direction and parallel to the surface of the carrier body.

In an alternative embodiment it is, however, also conceivable to vary the temperature-responsive variable resistance of the resistance body with its extension in the transverse direction in accordance with the mass flow density in that the temperature-responsive resistance is altered due to variation of the length of the current path.

In the simplest case, the current path has a constant cross section transverse to the direction of flow.

When designing the current path it has proven expedient for this to have a path component extending alternatingly at right angles to the transverse direction. In this respect, this alternatingly extending path component is possible either due to an angular design of the current path or due to a zigzag design thereof or any optionally irregular form of wavy lines.

The variation of the temperature-responsive resistance may be achieved in the simplest way by variation of the path component of the current path at right angles to the transverse direction, in relation to the respective unit of length in the transverse direction. This is, for example, possible due to the varying pitch of windings or also the varying length of zigzag loops of a zigzag path. From a constructional point of view, a particularly simple solution is one in which the current path is determined by the windings of a resistance wire. The path length may also be advantageously varied due to the number of windings per unit of length of the extension in the transverse direction.

Additional features and advantages of the invention are the subject of the following description as well as the drawings of several embodiments. In the drawings.

Figure 1:
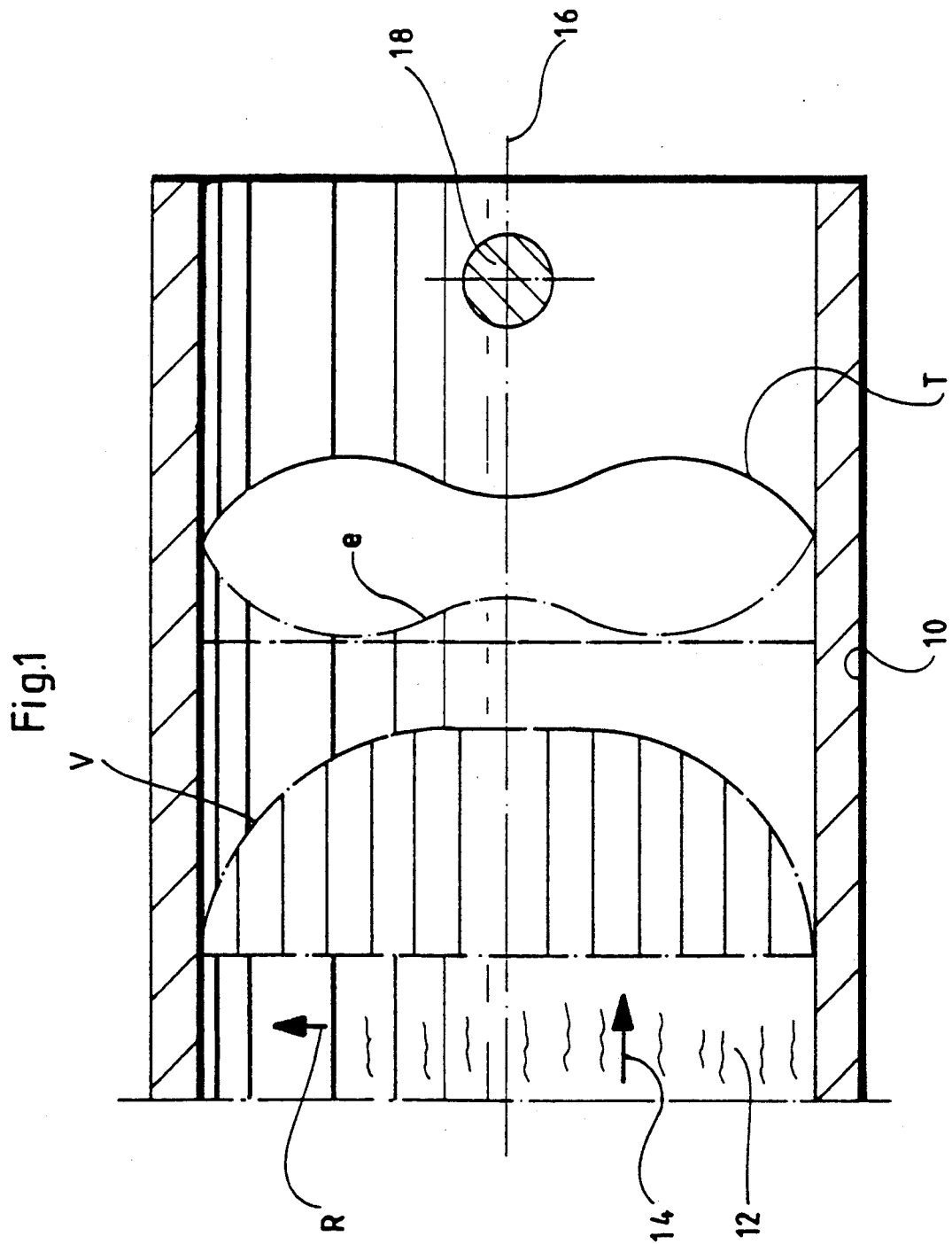
FIG. 1 shows a longitudinal section through a tube through which medium having a varying mass flow density flows.

FIG. 1 shows a tube designated as a whole as 10, in which steam designated as 12 flows in a flow direction, illustrated by the arrow 14, parallel to an axis 16 of the tube 10.

The medium 12 hereby flows at a flow velocity V varying in radial direction R and has a density $\rho$ also varying in the radial direction as well as a temperature T varying in the radial direction. The product of the density $\rho$ and the velocity V results in a mass flow density which also varies in radial direction R.

A sensor 18, which extends through the tube 10 in a radial direction R transverse and at right angles to the axis 16 and thereby intersects the axis 16, serves to measure the temperature of the steam 12, weighted according to the mass flow varying in radial direction R, and thereby determines a temperature value averaged on the basis of the mass flow density which corresponds to the temperature value of the completely mixed flow of steam, i.e. steam at the same velocity and same density.

A measurement of this type with the inventive sensor 18 is preferably carried out, for a hydrogen/oxygen steam generator, in a combustion chamber, and in an end region of the combustion chamber, in which the steam is generated completely as such but due to the generating conditions in the steam generator flows at a varying velocity in radial direction R to the axis 16 of the steam generator.

Figure 2:
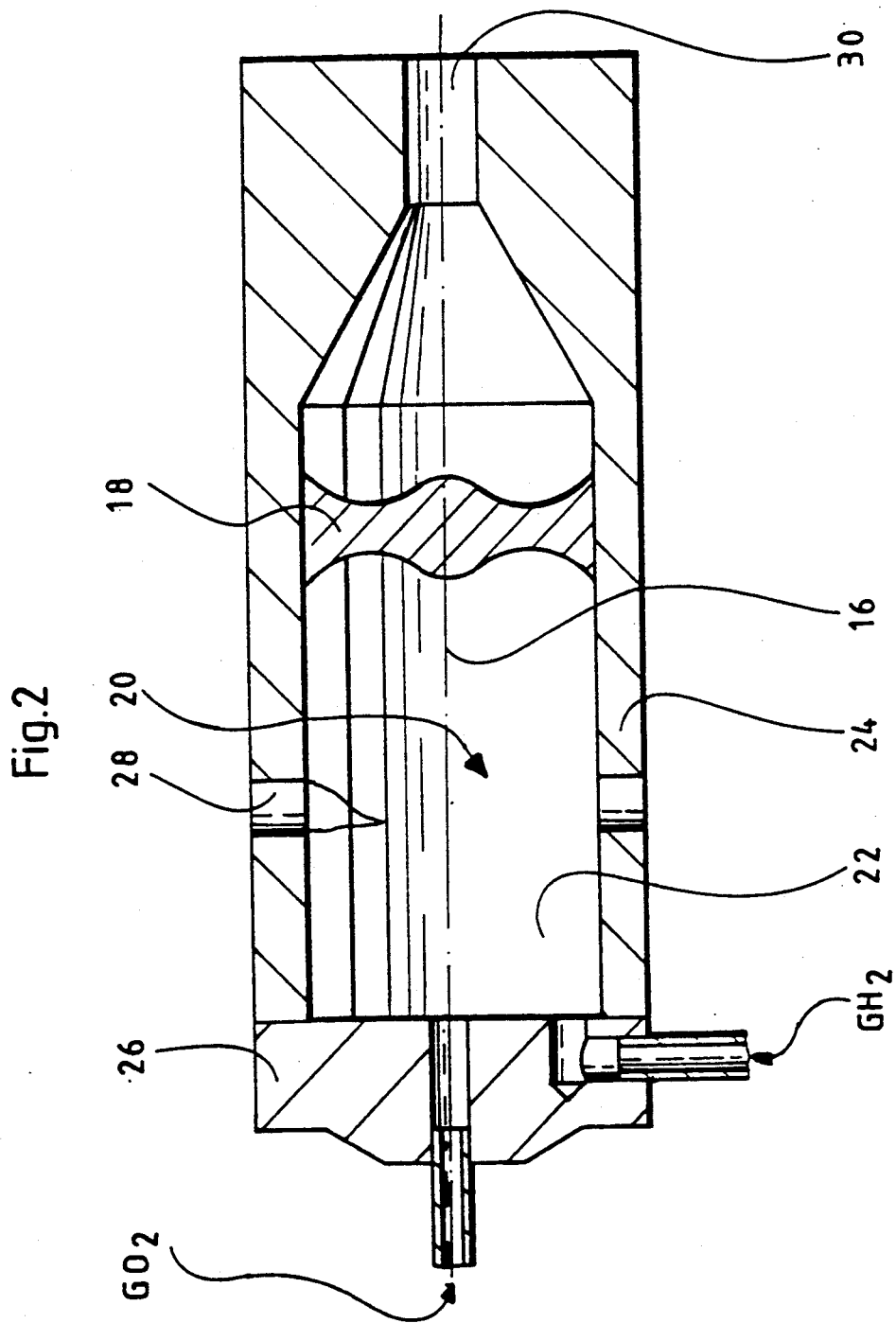
FIG. 2 is a longitudinal section through a steam generator with an inventive sensor.

A steam generator of this type, designated as a whole as 20, is illustrated in FIG. 2. It comprises a combustion chamber 22 enclosed by a housing 24. This housing is closed on one side by an injection head 26, through which the mixture of hydrogen and oxygen is injected into the combustion chamber 22 in stoichiometric ratios and combusted. In addition, the combustion chamber is provided with at least one injection ring 28 for water which is used to generate a saturated or superheated steam. The steam generated in the combustion chamber 22 exits the chamber at an end opposite the injection head through an extraction opening 30.

The sensor 18 is arranged in a region of the combustion chamber facing the extraction opening 30 and serves to determine the temperature averaged on the basis of the mass flow density of the steam produced, at the homogeneous flow and density ratios illustrated in FIG. 1, so that it is possible to predict the temperature of the steam, after leaving the extraction opening 30 and flowing along an additional path, as it enters a turbine with the same density and homogeneous temperature on the basis of its complete mixing.

This necessity for measuring the temperature of the steam averaged on the basis of the mass flow density by way of the sensor 18 within the combustion chamber 22 results from the fact that the steam generator 20 has to be controlled with respect to the amount of injected hydrogen and oxygen as well as the amount of water to be injected. In this respect the controlling distance between the formation of the steam and the measurement of the temperature has to be as short as possible.

Figure 3:
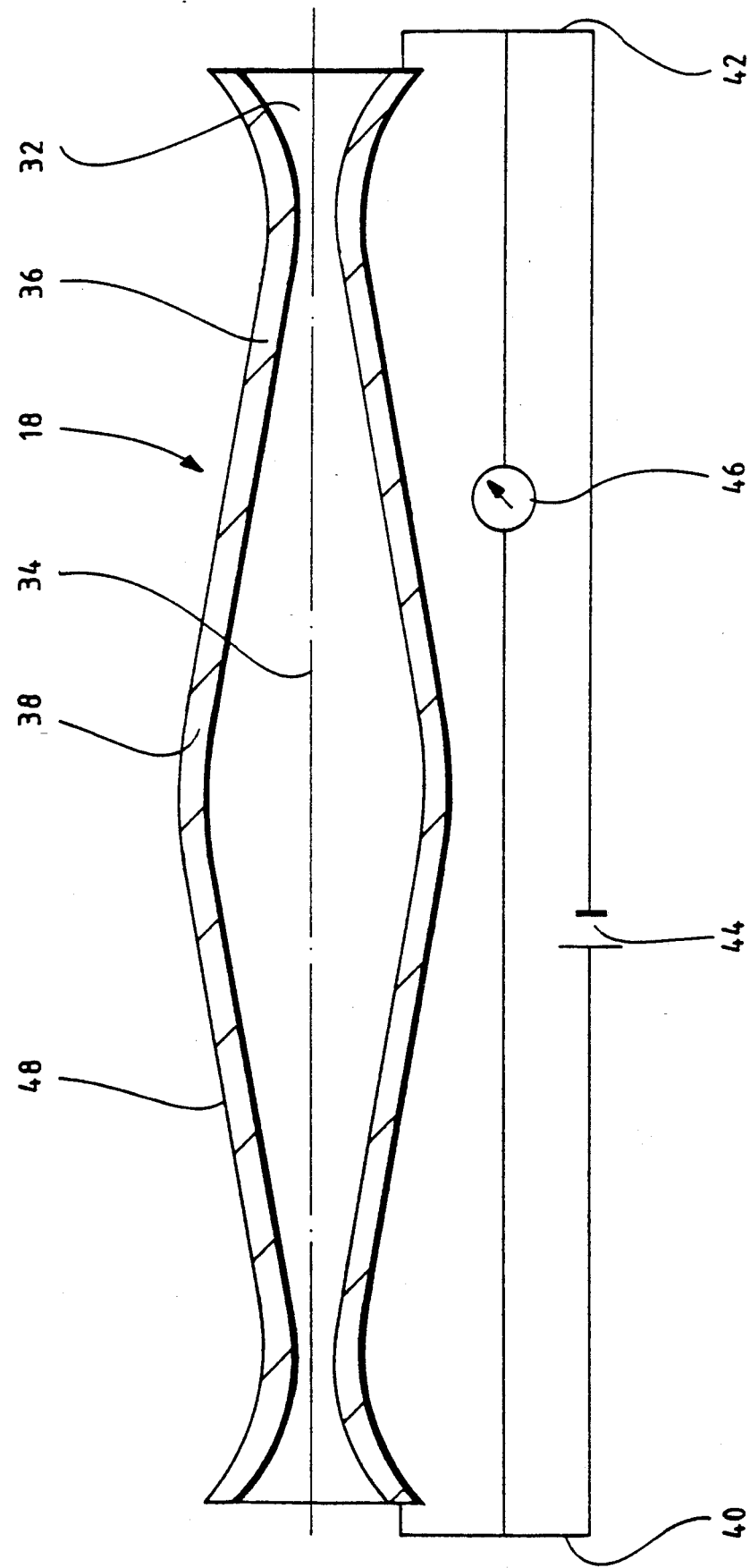
FIG. 3 is a longitudinal section through a first embodiment of an inventive sensor.

A first embodiment of an inventive sensor 18, illustrated in FIG. 3, comprises a carrier body 32 which, with its longitudinal direction 34, extends parallel to the radial direction R and therefore at right angles to the axis 16 of the tube 10 or the combustion chamber 22 formed by the tube.

The carrier body is preferably designed to be rotationally symmetrical to the longitudinal axis 34 and bears on an outer surface 36 a resistance body 38 which is applied in the form of a film 48 and by way of vapour deposition and which consists of a material having for its part a resistance variable in response to temperature.

The film forming the resistance body 38 is applied at a constant thickness to the entire outer surface 36 of the carrier body 32 and makes contact at each end with a line 40 and 42, respectively, via which current flows from a current source 44. The voltage drop between the lines 40 and 42 and, therefore, the voltage drop at the resistor body 38 is established by means of a measuring device 46.

The shape of the carrier body 32, in particular of its outer surface 36, is determined by the distribution of the mass flow density in radial direction and, therefore, in the direction of the longitudinal axis 34. The cross-sectional area A (R) of the resistor body 38 in response to the extension in the radial direction R is given, by way of example, by the following equation:

$$A(R) = \frac{C}{V(R) \times \rho(R) \times R}$$

wherein C comprises different constants of proportionality and, inter alia, the specific electrical resistance at a suitable operating temperature, the temperature coefficient of the electrical resistance and the diameter.

On the basis of this cross-sectional area A(R) to be determined according to the respective extension in the radial direction R, the shape of the carrier body can then be established proceeding from the fact that the film forming the resistor body 38 is intended to have a constant thickness and the carrier body 32 is intended to be rotationally symmetrical to the longitudinal axis 34. In this respect, a varying thickness of the carrier body 32 transverse to the longitudinal direction 34 will result in a larger cross-sectional area of the film of the resistor body 38 applied to the outer surface 36 whereas a thinner carrier body 32 will result in a small cross-sectional area.

Figure 4:
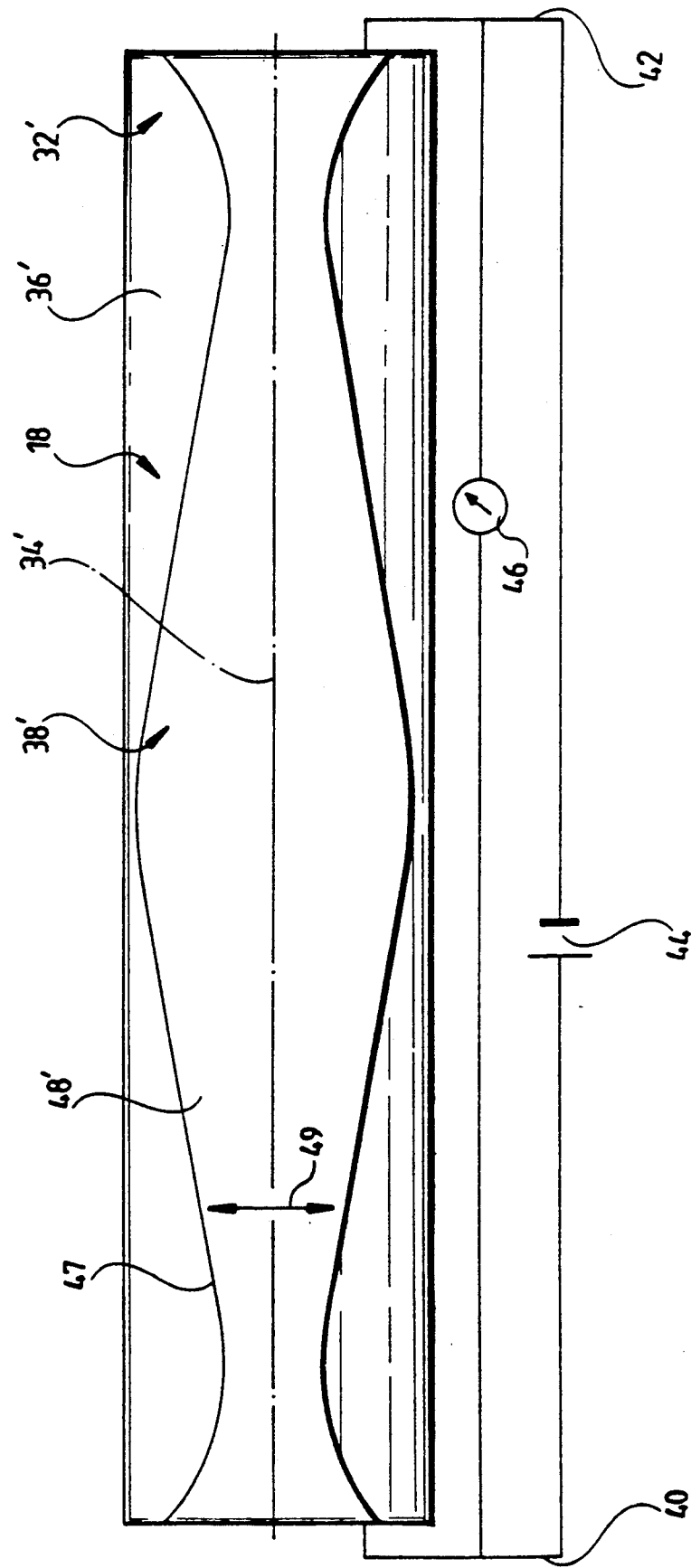
FIG. 4 is a plan view onto a second embodiment of an inventive sensor.

In a second embodiment of an inventive sensor 18, illustrated in FIG. 4, the parts which are identical to those of the first sensor have been given the same reference numerals. Reference may therefore be made to the comments on the first embodiment insofar as no additional comments are to be made in conjunction with the second embodiment.

In contrast to the first embodiment, this sensor 18 has a carrier body 32' formed by a cylinder having a constant cross-sectional area, the longitudinal axis 34' of which also extends in radial direction R.

The resistor body 38' is applied by vapour deposition to the outer surface 36' of the carrier body 32' as film 48' having a constant thickness. The film 48' has, in this respect, an outer contour 47 which has a varying width in a transverse direction 49 which extends at right angles to the longitudinal axis 64 and parallel to an outer surface 36', i.e. in the azimuthal direction in relation to the longitudinal axis 64. This means that the cross-sectional area A(R) of the resistor body, which is the product of the width of the film 48' and the thickness of the film, varies with the width of the outer contour 47.

Figure 5:
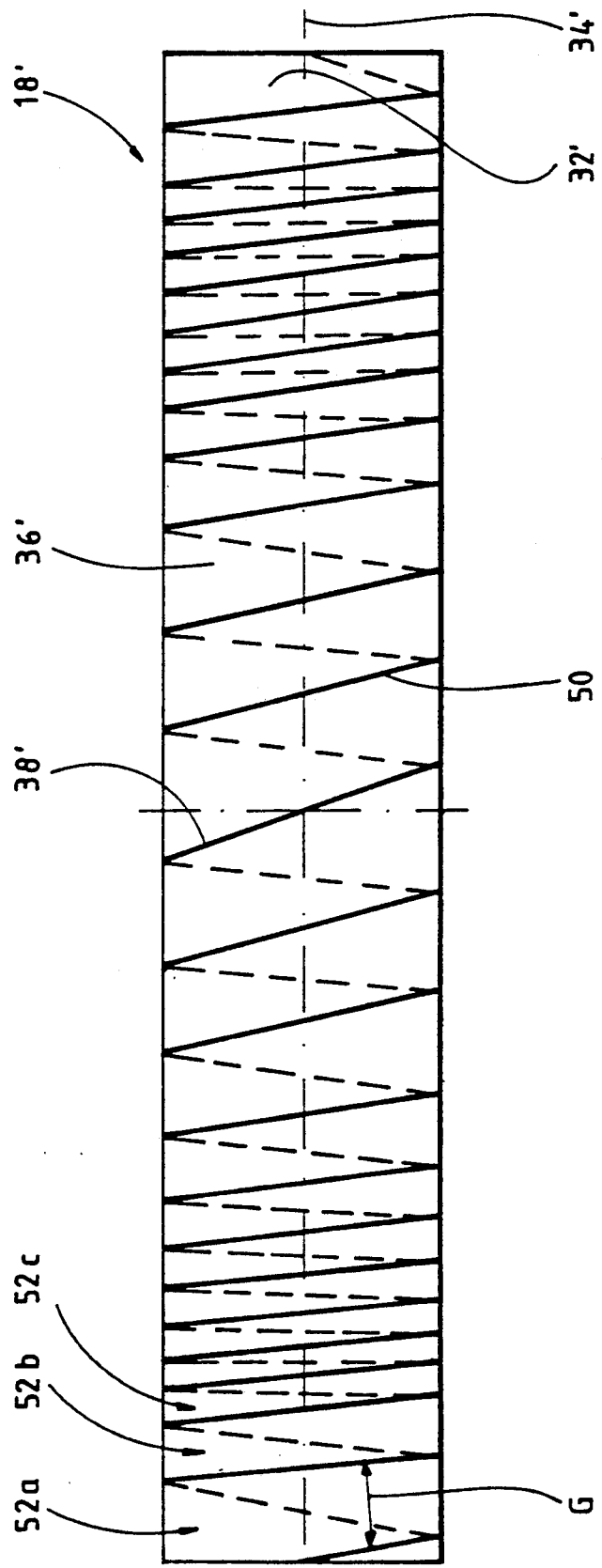
FIG. 5 is a plan view onto a third embodiment of an inventive sensor.

In a third embodiment of an inventive sensor 18', illustrated in FIG. 5, those parts which are identical to the parts of the first and second embodiments of the inventive sensor have been given the same reference numerals. Reference may therefore be made to the comments on the first embodiment insofar as no additional comments are to be made in conjunction with the third embodiment.

As in the second embodiment, this sensor 18' has a carrier body 32' formed by the cylinder having a constant cross-sectional area, the longitudinal axis 34' of which also extends in the radial direction.

The resistor body 38' is applied to the outer surface 36' of the carrier body 32' in the form of a helical winding of a resistance wire 50 which is wound onto the outer surface 36' coaxially to the longitudinal axis 34'.

To bring about a variation in the temperature-responsive variable resistance of the resistor body with its extension in the radial direction R according to the mass flow density, the pitch G of the individual, successive windings 52a, b, c, . . . is selected such that it varies so that the current flowing through the resistance wire 50 has to cover a path of varying length per unit of length in the radial direction and, therefore, the temperature-responsive resistance of the resistor body 38' also varies. For example, a large pitch produces a smaller, temperature-responsive, variable contribution of the resistance body whereas a small pitch means that the current has to cover a greater path per unit of length in the radial direction R and therefore the temperature-responsive variable contribution of the resistor body 38' is also greater.

The present disclosure relates to the subject matter disclosed in German application No. P 39 37 783.0 of Nov. 14, 1989, the entire specification of which is incorporated herein by reference.

What is claimed is:

1. Apparatus for determining the average temperature of a medium flowing through a tube based on the mass flow density of said medium, comprising:
   a tube for receiving a mass flow of a medium along a longitudinal axis thereof, said medium having a mass flow density gradient and a temperature gradient in a direction transverse to said longitudinal axis;
   a sensor body mounted within said tube, said sensor body extending in a longitudinal direction transverse to the longitudinal axis of said tube;
   a temperature sensitive resistor element positioned on said sensor body, said resistor element having a temperature responsive electrical which varies along the length of said resistor element in said longitudinal direction in correspondence to the variation of said mass flow density gradient of said medium; and
   means for measuring the total resistance over the total extension of said resistor element in said longitudinal direction;
   wherein said total resistance is representative of the average temperature of the medium flowing through said tube weighted according to the mass flow density of the medium.

2. Apparatus in accordance with claim 1 wherein said resistor element has a current-carrying cross sectional area with respect to said longitudinal direction, said cross sectional area varying along the length of said resistor element in said longitudinal direction for obtaining said variation of said temperature responsive electrical resistance in said longitudinal direction.

3. Apparatus in accordance with claim 1 wherein said resistor element comprises a layer of resistive material coating a surface of said sensor body.

4. Apparatus in accordance with claim 3 wherein said layer of resistive material has a locally constant, specific temperature responsive resistance.

5. Apparatus in accordance with claim 3 wherein said layer of resistive material is applied to said sensor body by vapor deposition.

6. Apparatus in accordance with claim 3 wherein said layer of resistive material has a uniform thickness.

7. Apparatus in accordance with claim 3, wherein the variation in the current carrying cross-sectional area of said layer results from a varying expansion of said layer of resistive material at right angles to said longitudinal direction.

8. Apparatus in accordance with claim 7, wherein said expansion of said layer of resistance material is determined by an extension of the surface of said sensor body at right angles to said longitudinal direction.

9. Apparatus in accordance with claim 7, wherein said expansion of said layer of resistive material varies in a direction vertical and parallel to the surface of said sensor body.

10. Apparatus in accordance with claim 1, wherein said temperature-responsive resistance varies due to variation of a length of a current path per unit length of said sensor body in said longitudinal direction.

11. Apparatus in accordance with claim 10, wherein said current path has a constant cross section transverse to a direction of current flow through said resistor element.

12. Apparatus in accordance with claim 11, wherein said current path is determined by the windings of a resistance path.

13. Apparatus in accordance with claim 12, wherein said length of said current path per unit length in said longitudinal direction varies due to the number of windings per unit length in said longitudinal direction.

* * * * *